Patented Apr. 3, 1951

2,547,912

UNITED STATES PATENT OFFICE 2,547,912

DISAZO DYESTUFFS

Peter Hindermann, Basel, Switzerland, assignor to J. R. Geigy A. G., Basel, Switzerland No Drawing. Application September 7, 1948, Serial No. 48,156. In Switzerland September 15, 1947

6 Claims. (Cl. 260—178)

This invention is concerned with the manufacture of copperable dis- and polyazo dyestuffs which give dyeings with excellent fastness properties on cotton.

The copperable polyazo dyestuffs are very popular because of their simplicity in use, their very good fastness to light, their sometimes remarkably good fastness under wet conditions and their cheapness. Their importance has considerably increased in recent years since polyazo dyestuffs have been successfully prepared whose coppered dyeings on cellulose have satisfactory fastness properties, even with repeated soap-washing.

According to the present invention I have found that valuable copperable dis- and polyazo dyestuffs are obtained when 1 mol of a tetrazotised diamine of the general formula

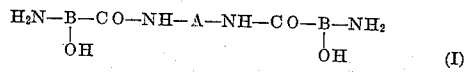

(I)

wherein

A stands for a 4:4'-biphenylene radical and
B represents a phenyl radical carrying the amino group in m-position to the carbonyl-group and the hydroxyl group in p-position to the latter, is coupled with 2 mols of a naphthol-sulfonic acid coupling in the ortho position to the hydroxyl group and which may contain further substituents usual in coupling components and also azo groups. According to the choice of coupling components Bordeaux red to violet dyestuffs are obtained whose coppered dyeings on cellulose are distinguished by remarkably pure shades and extraordinary fastness to repeated soap-washing.

The diamines used in the invention may be obtained by known methods (see, e. g., Brit. Pat. No. 341,970), for example, from 3-nitro-4-acetoxy- or 3-nitro-4-carbolkoxy-benzoyl chloride and a 4:4'-diamino compound of diphenyl, in a water-free organic solvent. It is expedient to carry out the reaction in the presence of an acid binding medium, such as sodium acetate, sodium carbonate, magnesium oxide, or tertiary bases such as pyridine or dimethylaniline, whereby the solvent or diluent used is chosen according to the solubility of the diamine. During condensation the acyl radical protecting the hydroxyl group is split off and the intermediate product of Formula I is obtained directly by reduction of the nitro group by the usual methods. When desired the acyl radical can also be removed by gentle hydrolysis before or after reduction in the intermediate product or even when part of the dyestuff molecule. Instead of the 3-nitro-4-acyloxy-benzoyl chlorides named in this patent specification there may be used 3-nitro-4-hydroxy-benzoyl chloride prepared by the action of thionyl chloride on 3-nitro-4-hydroxybenzoic acid. The diamino compound of diphenyl can of course have other substituents usual in azo dyestuffs in the aromatic rings, e. g., halogen, alkyl, alkoxy groups, but must contain no ionisable groups such as carboxy or sulfonic acid groups.

The dyestuffs from 4:4'-di-(3''-amino-4''-hydroxy - benzoylamino) -3:3' - dialkoxy - diphenyl have particularly good fastness properties combined with remarkable purity.

Suitable coupling components comprise all naphthol-sulfonic acids coupling in a position adjacent to the hydroxyl group. In addition to the substituents usual in azo dyestuffs these coupling components may contain further azo groups: particularly aminonaphthol - sulfonic acids and derivatives thereof modified at the amino radical. Bordeaux red dyestuffs are given by naphthol-sulfonic acids, while dyestuffs are given by the aminonaphthol-sulfonic acids and their derivatives modified at the nitrogen atom, as well as by acid coupled azo dyestuffs capable of coupling from aromatic diazo compounds and amino-naphthol-sulfonic acid. The number of sulfonic acid groups in the copperable polyazo dyestuffs of the invention is chosen so that the latter dyestuffs are sufficiently water-soluble. Two sulfonic acid groups have been found to be a most suitable number.

As is clear from the foregoing, those dyestuffs with the most valuable wet-fastness properties are derived from monosulfonated coupling components, in particular naphthol-monosulfonic acids and aminonaphthol-monosulfonic acids and their derivatives modified at the nitrogen atom. Coupling is often advantageously carried out in the presence of pyridine bases.

The polyazo dyestuffs of the invention can be coppered either in the dyebath or in a fresh bath with the usual copper salts, such as, e. g., copper sulfate or copper acetate, in a neutral or weakly acid medium. When required, copper compounds stable to alkalis can also be used, such as are obtained, for example, when copper sulfate is reacted with sodium tartrate in a bath made alkaline with sodium carbonate.

The following examples illustrate a few of the forms in which the manufacture may be carried out, without restricting it in any way however. Unless otherwise stated, parts are by weight and temperatures in degrees centigrade.

*Example 1*

51.4 parts of 4:4'-di-(3''-amino-4''-hydroxybenzoyl-amino)-3:3'-dimethoxydiphenyl are dissolved in 600 parts of cold water together with 8 parts of caustic soda lye. 13.8 parts of sodium nitrite are mixed in and the whole added dropwise to 40 parts of concentrated hydrochloric acid with 80 parts of water, the addition being also carried out cold. After the excess mineral acid has been neutralised with sodium carbonate, the greenish yellow suspension of tetrazo compound is added to a cold alkaline solution of 56.2 parts of 1-acetylamino-8-hydroxynaphthalene-4-sulfonic acid and 400 parts of water in the presence of 30 parts of sodium carbonate and 150 parts of pyridine. After stirring for several hours at room temperature coupling is complete. The disazo dyestuff obtained, having the formula:

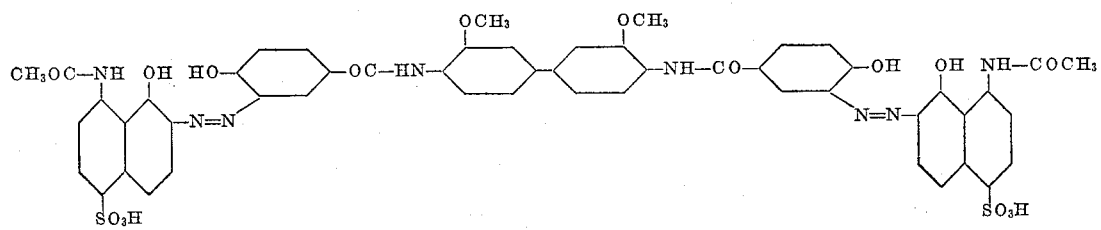

is precipitated with common salt, filtered off and dried. The new dyestuff is a dark powder giving a violet solution in water and a red one in concentrated sulfuric acid. It gives after-coppered dyeings in pure violet shades having excellent fastness properties on natural or regenerated cellulose.

Similar violet dyestuffs are obtained if instead of 51.4 parts of 4:4'-di-(3''-amino-4''-hydroxybenzoylamino)-3:3'-dimethoxydiphenyl there are used 45.4 parts of 4:4'-di-(3''-amino-4''-hydroxybenzoylamino)-diphenyl, 48.2 parts of 4:4'-di-(3''-amino-4''-hydroxybenzoylamino)-3:3'-dimethyldiphenyl or 52.5 parts of 4:4'-di-(3''-amino-4''-hydroxybenzoylamino)-3:3'-dichlorodiphenyl. Otherwise the procedure is exactly as in the above example.

*Example 2*

51.4 parts of 4:4'di-(3''-amino-4''-hydroxybenzoylamino)-3:3'-dimethoxydiphenyl are indirectly tetrazotized, as described in Example 1, the excess mineral acid neutralised with sodium carbonate and the mixture added at a low temperature to an aqueous solution of 80.6 parts of a monoazo dyestuff obtained by acid coupling of diazotized 5-amino-2-hydroxy-benzene-carboxylic acid with 2-amino-5-hydroxynaphthalene-7-sulfonic acid, 800 parts of water, 40 parts of sodium carbonate and 150 parts of pyridine. The reaction mixture is allowed to rise to normal temperature, while stirring. After several hours a tetrakisazo dyestuff of the formula

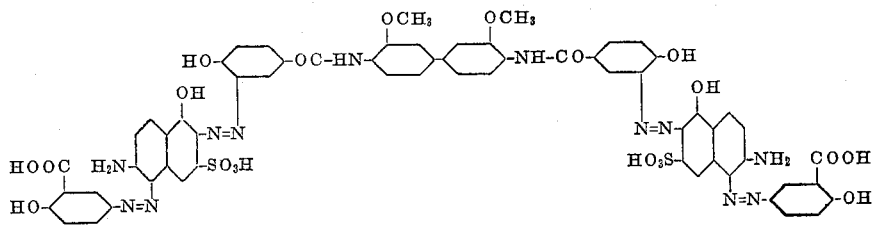

is formed and separated by adding common salt. When dry it is a brown powder, dissolving in water to give a Bordeaux red and in concentrated sulfuric acid to give a dull violet colour. It dyes cotton or staple fibre, after-coppered, in pure Bordeaux red shades.

If the dyestuff is built up using, instead of 51.4 parts of 4:4'-di-(3''-amino-4''-hydroxybenzoylamino)-3:3'-dimethoxydiphenyl, 58.3 parts of 4:4-di-(3''-amino-4''-hydroxy-6''-chlorobenzoylamino)-3:3'-dimethoxydiphenyl, 54.2 parts of 4:4'-di-(3''-amino-4''-hydroxy-5''-methylbenzoylamino)-3:3'-dimethoxydiphenyl or 51.4 parts of 4:4'-di-(3''-amino-4''-hydroxy-6''-methoxybenzoylamino)-diphenyl, otherwise exactly following the above example, there are obtained similar Bordeaux red dyestuffs with similar properties.

Example 3

45.4 parts of 4:4'-di-(3''-amino-4''-hydroxybenzoylamino)-diphenyl are dissolved cold in 600 parts of water with 8 parts of caustic soda lye, mixed with 13.8 parts of sodium nitrite and added dropwise in the cold, while stirring, to 40 parts of concentrated hydrochloric acid and 80 parts of water. The excess mineral acid is neutralised with sodium carbonate and the greenish yellow suspension of tetrazo compound mixed with a cold alkaline solution of 44.8 parts of 2-hydroxynaphthalene - 4 - sulphonic acid in 400 parts of water, in the presence of 30 parts of sodioum carbonate and 150 parts of pyridine. After stirring for several hours at room temperature coupling is complete. The disazo dyestuff obtained has the formula

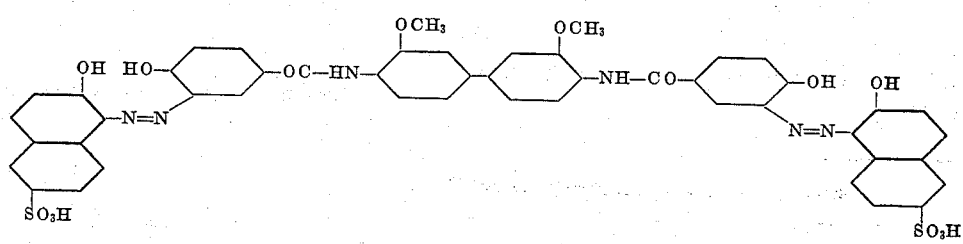

and is precipitated with common salt, filtered off and dried. It is a dark powder which dissolves in water giving a violet solution and in concentrated sulfuric acid to give a red one. It dyes cotton or staple fibre in Bordeaux red shades which are converted on after-treatment with copper sulfate into a purer Bordeaux with very good fastness properties.

If instead of with 45.4 parts of 4:4'-di-(3''-amino-4''-hydroxybenzoylamino)-diphenyl the dyestuff is built up with 51.4 parts of 4:4'-di-(3'' - amino-4''-hydroxybenzoylamino)-3:3'- dimethoxy-diphenyl, 48.2 parts of 4:4'-di-(3''-amino - 4'' - hydroxybenzoylamino) - 3:3'-dimethyldiphenyl or 52.5 parts of 4:4'-di-(3''-amino-4''-hydroxybenzoylamino)-3:3'-dichlorodiphenyl, otherwise exactly following the above example, then similar Bordeaux red dyestuffs with similar properties are obtained.

Example 4

51.4 parts of 4:4'-di-(3''-amino-4''-hydroxybenzoyl-amino)-3:3'-dimethoxydiphenyl are dissolved cold in 600 parts of water with 8 parts of caustic soda lye, mixed with 13.8 parts of sodium nitrite and added dropwise in the cold, while stirring, to 40 parts of concentrated hydrochloric acid and 80 parts of water. The excess mineral acid is neutralised with sodium carbonate and the greenish yellow suspension of tetrazo compound mixed with a cold alkaline solution of 44.8 parts of 2-hydroxy-naphthalene-6-sulfonic acid in 400 parts of water, in the presence of 30 parts of sodium carbonate and 150 parts of pyridine. After stirring for several hours at room temperature coupling is complete. The disazo dyestuff obtained has the formula

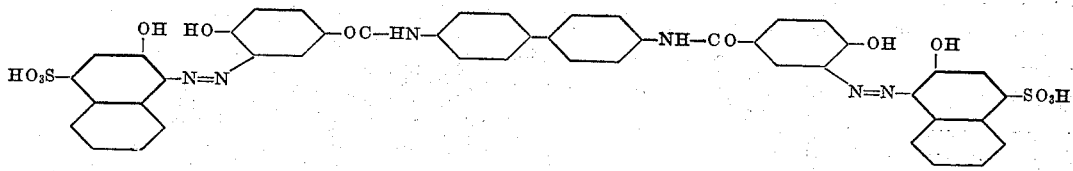

and is precipitated with common salt, filtered off and dried. It is a dark powder which dissolves in water giving a violet solution and is concentrated sulfuric acid to give a red one. It dyes cotton or staple fibre in Bordeaux red shades which are converted on after-treatment with copper sulfate into a purer Bordeaux having very good fastness to light and wet conditions.

If instead of with 44.8 parts of 2-hydroxynaphthalene-6-sulphonic acid the dyestuff is built up with 44.8 parts of 1-hydroxynaphthalene-4-sulfonic acid or 44.8 parts of 2-hydroxynaphthalene-7-sulfonic acid as coupling component, then similar Bordeaux red dyestuffs with similar properties are obtained.

Example 5

Two parts of the dyestuff of Example 1 are dissolved in a dyebath containing 3000 parts of water and 2 parts of sodium carbonate. 100 parts of cotton are entered into the bath at 40-50°, the temperature raised to 90-95° within 30 minutes, 30 parts of sodium sulfate are added and dyeing continued for 45 minutes at this temperature. The dyed goods are then rinsed cold and after-treated for 30 minutes at 70° in a fresh bath containing 2 parts of crystallised copper sulfate in 2000 parts of water and 2 parts of 30% acetic acid. Rinsing and drying are carried out in the usual manner. The cotton is dyed in pure violet shades with outstanding fastness properties.

To illustrate the invention further a number of examples have been collected together in the following table. The method of manufacture is the same throughout as described in the foregoing. In the first column are listed the two starting materials for the fundamental semi-urea component, under nitrohydroxybenzoyl chloride and diamine. The second column contains the coupling component with the hydroxyl group.

the group consisting of H, Cl, CH₃ and OCH₃, and D represents a carbocyclic naphthol sulfonic acid radical coupled in o-position to its hydroxyl group.

2. A disazo dystuff corresponding to the formula

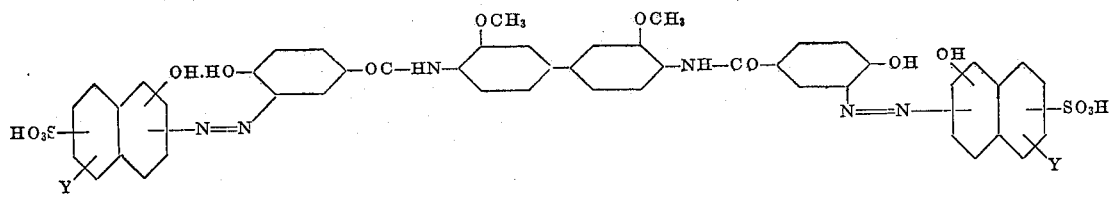

wherein Y stands for a member selected from

| Diamine I = Reduction product from the benzoylation of— | | naphthol-sulfonic acid | Shade of the coppered dyeing on cellulose fibres |
|---|---|---|---|
| 2 Mol. Nitro-hydroxy-benzoyl chloride with→ | 1 Mol. diamine | | |
| 1  3-nitro-4-hydroxy-benzoyl chloride | 4:4'-diaminodiphenyl | 1-hydroxy-naphthalene-4-sulfonic acid | bordeaux. |
| 2  ___do___ | ___do___ | 2-hydroxy-naphthalene-7-sulfonic acid | Do. |
| 3  ___do___ | 4:4'-diamino-3:3'-dimethoxy-diphenyl | 2-(4'-amino-benzoylamino)-5-hydroxy-naphthalene-7-sulfonic acid | violet. |
| 4  3-nitro-4-hydroxy-benzoyl chloride | ___do___ | 2-(3'-amino-benzoylamino)-5-hydroxy-naphthalene-7-sulfonic acid | Do. |
| 5  ___do___ | ___do___ | 5:5'-dihydroxy-2:2'-dinaphthylamine-7:7'-di-sulfonic acid | Do. |
| 6  ___do___ | 4:4'-diamino-3:3'-dimethyl-diphenyl | ___do___ | Do. |
| 7  3-nitro-4-hydroxy-5-bromo-benzoyl chloride | 4:4'-diaminodiphenyl | 2-hydroxy-naphthalene-4-sulfonic acid | bordeaux. |
| 8  ___do___ | ___do___ | 1-hydroxy-naphthalene-4-sulfonic acid | Do. |
| 9  3-nitro-4-hydroxy-6-chlorobenzoyl chloride | ___do___ | 2-acetylamino-6-hydroxy-naphthalene-8-sulfonic acid | violet. |
| 10 ___do___ | 4:4'-diamino-3:3'-dimethyl-diphenyl | 1-benzoylamino-8-hydroxy-naphthalene-4-sulfonic acid | Do. |
| 11 3-nitro-4-hydroxy-5-methyl-benzoyl chloride | 4:4'-diamino-3:3'-dimethoxy-diphenyl | 2-benzoylamino-6-hydroxy-naphthalene-8-sulfonic acid | Do. |
| 12 ___do___ | ___do___ | 1-methylamino-8-hydroxy-naphthalene-4-sulfonic acid | Do. |
| 13 3-nitro-4-hydroxy-5-methoxy-benzoyl chloride | ___do___ | 1-hydroxy-naphthalene-5-sulfonic acid | bordeaux. |
| 14 ___do___ | ___do___ | 2-acetylamino-5-hydroxy-naphthalene-1-sulfonic acid | Do. |
| 15 3-nitro-4-hydroxy-benzoyl chloride | 4:4'-diamino-3:3'-dichlorodiphenyl | 2-hydroxy-naphthalene-7-sulfonic acid | Do. |
| 16 ___do___ | ___do___ | monoazo: 5-amino-2-hydroxybenzene-carboxylic acid →acid J-acid. | Do. |
| 17 ___do___ | ___do___ | 2-acetylamino-8-hydroxy-naphthalene-6-sulfonic acid | violet. |
| 18 ___do___ | ___do___ | 2-phenylamino-5-hydroxy-naphthalene-7-sulfonic acid | bordeaux. |
| 19 ___do___ | 4:4'-diaminodiphenyl | 2-amino-5-hydroxy-naphthalene-7-sulfonic acid | Do. |
| 20 ___do___ | ___do___ | 2-amino-6-hydroxy-naphthalene-7-sulfonic acid | Do. |

What I claim is:

1. A disazo dyestuff corresponding to the formula

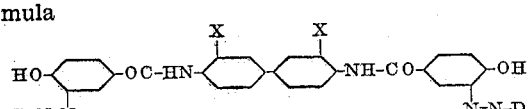

wherein X stands for a member selected from the group consisting of H and acylamino, and the naphthol sulfonic acid radical is coupled in o-position to its hydroxyl group.

3. A disazo dyestuff corresponding to the formula

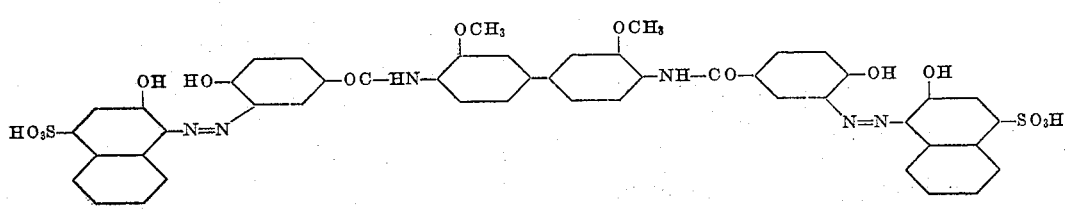

4. A disazo dyestuff corresponding to the formula
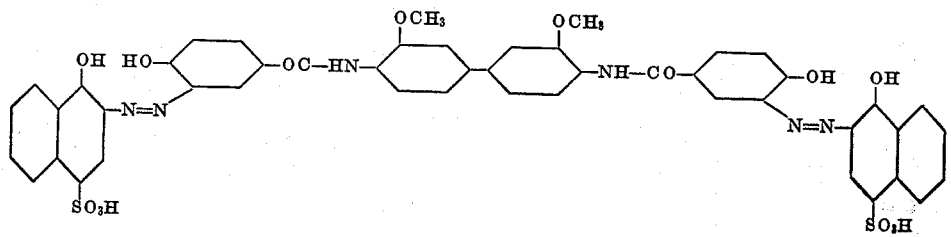
5. A disazo dyestuff corresponding to the formula
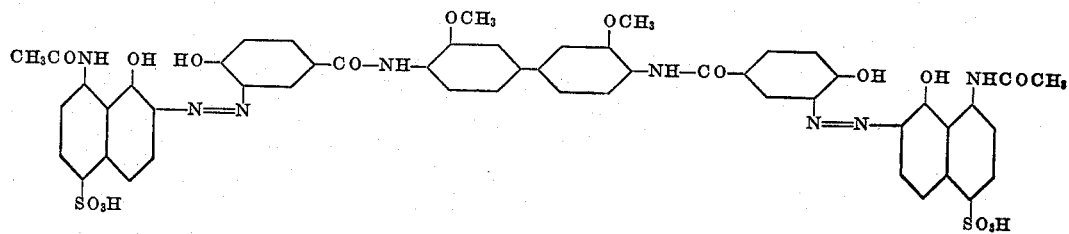
6. A disazo dyestuff corresponding to the formula
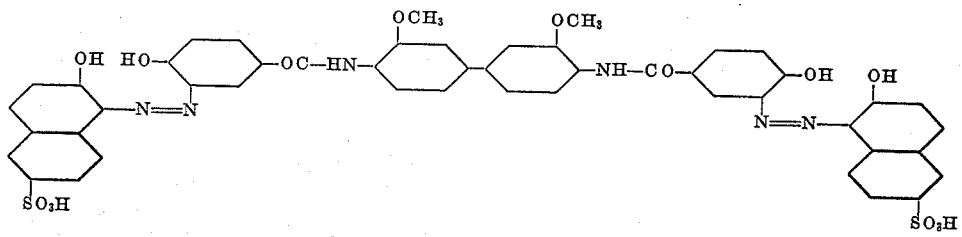
PETER HINDERMANN.
REFERENCES CITED
The following references are of record in the file of this patent:
UNITED STATES PATENTS
| Number | Name | Date |
|---|---|---|
| 1,899,856 | Montmollin et al. | Feb. 28, 1933 |
| 1,901,387 | Wiedemann et al. | Mar. 14, 1933 |
| 2,400,092 | Anderson | May 14, 1946 |